(12) United States Patent
Ishii

(10) Patent No.: US 9,188,837 B2
(45) Date of Patent: Nov. 17, 2015

(54) IMAGE PICKUP APPARATUS, METHOD OF CONTROLLING THE SAME, AND STORAGE MEDIUM

(75) Inventor: Kazunori Ishii, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 367 days.

(21) Appl. No.: 12/495,166

(22) Filed: Jun. 30, 2009

(65) Prior Publication Data

US 2010/0002128 A1 Jan. 7, 2010

(30) Foreign Application Priority Data

Jul. 4, 2008 (JP) ................................. 2008-175620

(51) Int. Cl.
*H04N 5/232* (2006.01)
*G03B 13/36* (2006.01)
*G03B 3/00* (2006.01)

(52) U.S. Cl.
CPC ........ *G03B 13/36* (2013.01); *G03B 3/00* (2013.01); *H04N 5/23212* (2013.01); *H04N 5/23219* (2013.01)

(58) Field of Classification Search
USPC .......... 396/123, 121; 348/345, 240.99, 222.1, 348/349; 359/823; 382/195
See application file for complete search history.

(56) References Cited

U.S. PATENT DOCUMENTS 6,204,880 B1 * 3/2001 Nishimura ............... 348/240.99
7,471,330 B2 12/2008 Okawara 2003/0077264 A1 4/2003 Goodrich
2005/0185083 A1 8/2005 Okawara
2005/0270410 A1 * 12/2005 Takayama ..................... 348/345
2006/0072915 A1 * 4/2006 Onozawa ...................... 396/121
2006/0077264 A1 4/2006 Ikeda (Continued)

FOREIGN PATENT DOCUMENTS

EP 1885119 A2 2/2008
JP 05-064056 3/1993

(Continued)

OTHER PUBLICATIONS

Sep. 8, 2010 Chinese Office Action, which is enclosed with English Translation, that issued in Chinese Patent Application No. 200910150699.9.

(Continued)

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

An image pickup apparatus which is capable of performing stable and high-speed focusing on an object intended by a photographer. In a video camera as the image pickup apparatus, an image pickup element picks up an object image formed by a photographic optical system including a focus lens and thereby outputs a video signal. A face-detecting section detects a face detection area based on the video signal. An AF signal processing circuit generates an AF evaluation value signal. An external ranging unit generates object distance information. A microcomputer performs a TV-AF process using an AF evaluation value of the AF evaluation value signal and an external ranging AF process using the object distance information. The microcomputer controls execution of the two focus control processes according to a result of the detection by the face-detecting section.

7 Claims, 14 Drawing Sheets

(56) References Cited

U.S. PATENT DOCUMENTS

| | | | |
|---|---|---|---|
| 2006/0182433 A1* | 8/2006 | Kawahara et al. | 396/123 |
| 2007/0280662 A1* | 12/2007 | Endo | 396/67 |
| 2008/0025714 A1* | 1/2008 | Ishii | 396/104 |
| 2008/0055751 A1* | 3/2008 | Morimoto | 359/823 |
| 2008/0122939 A1* | 5/2008 | Hirai | 348/222.1 |
| 2010/0110236 A1* | 5/2010 | Kurokawa et al. | 348/241 |
| 2011/0181769 A1* | 7/2011 | Ishii | 348/345 |

FOREIGN PATENT DOCUMENTS

| | | |
|---|---|---|
| JP | 2001-215403 | 8/2001 |
| JP | 2003-302571 A | 10/2003 |
| JP | 2005-215040 A | 8/2005 |
| JP | 2005-234325 | 9/2005 |
| JP | 2006-227080 | 8/2006 |
| JP | 2006-235616 A | 9/2006 |
| JP | 2007-279333 A | 10/2007 |
| JP | 2008-026788 A | 2/2008 |
| JP | 2008-032963 A | 2/2008 |
| JP | 2008-061157 A | 3/2008 |

OTHER PUBLICATIONS

Dec. 1, 2009 European Search Report of the counterpart European Patent Application No. 09164512.7.

Jun. 26, 2012 Japanese Office Action, which is enclosed without an English Translation, that issued in Japanese Patent Application No. 2008-175620.

Jan. 22, 2013 Japanese Office Action, which is enclosed without English Translation, that issued in Japanese Patent Application No. 2008-175620.

Jun. 10, 2013 Japanese Office Action, which is enclosed without an English Translation, that issued in Japanese Patent Application No. 2012-184136.

* cited by examiner

WIDE SIDE

TELEPHOTO SIDE

IMAGE PICKUP APPARATUS, METHOD OF CONTROLLING THE SAME, AND STORAGE MEDIUM

BACKGROUND OF THE INVENTION

1. Field of the Invention

The present invention relates to an image pickup apparatus, a method of controlling the same, and a storage medium, and more particularly to an image pickup apparatus configured to detect an object area in an image pickup screen and perform focus control based on a result of the detection.

2. Description of the Related Art

In the autofocus (AF) control of an image pickup apparatus, such as a video camera, a TV-AF method is predominant in which an AF evaluation value signal is generated that is indicative of the sharpness (contrast state) of a video signal generated using an image pickup element, and a focus lens position that is searched for that represents where the AF evaluation value signal assumes a maximum value.

Further, there has been known an image pickup apparatus having a human face detecting function so as to stably focus on a human object in the case of photographing a human being. For example, an image pickup apparatus has been proposed in which a focus detection area including a recognized face detection area is set and then focus detection is performed (see e.g. Japanese Patent Laid-Open Publication No. 2006-227080). Furthermore, there has been proposed an image pickup apparatus in which human eyes are detected, and focus detection is performed based on the detected human eyes (see e.g. Japanese Patent Laid-Open Publication No. 2001-215403).

The AF method includes an external ranging method (external phase difference detection method) in which a ranging sensor is provided separately from a photographic lens, and an in-focus position of a focus lens is calculated based on information indicative of an object distance detected by the ranging sensor. The focus lens is then moved to the calculated in-focus position.

In this external phase difference detection method, an optical flux received from an object is divided into two, and the divided optical flux components are received by a pair of light receiving element arrays (line sensors), respectively. Then, the amount of shift between images formed on the respective line sensors, i.e. a phase difference between the two images is detected, and an object distance is determined based on the phase difference using a triangulation technique. Then, the focus lens is moved to a position (in-focus position) where the object is focused at the object distance.

The AF method includes an internal (TTL) phase difference detection method.

In this internal phase difference detection method, an optical flux having passed through the emission pupil of a photographic lens is divided into two, and the divided optical flux components are received by a pair of focus detecting sensors, respectively. Then, the amount of deviation of focus of the photographic lens and the direction of the focus deviation are directly obtained by detecting the amount of shift between output images, i.e. the amount of relative positional shift in an optical flux-dividing direction, based on the respective amounts of received light, and the focus lens is moved based on the amount of deviation of the focus of the photographic lens and the direction of the focus deviation.

Further, a hybrid AF method as a combination of the internal phase difference detection method and the TV-AF method has also been proposed. In the hybrid AF method, a focus lens is moved close to an in-focus position using the internal phase difference detection method, and then the focus lens is more accurately moved to the in-focus position using the TV-AF method (see e.g. Japanese Patent Laid-Open Publication No. H05-064056 (paragraphs [0008] to [0009], FIG. 1, etc.)). There has been proposed another hybrid AF method in which the external phase difference detection method and the TV-AF method are combined (see e.g. Japanese Patent Laid-Open Publication No. 2005-234325 (paragraphs [0037] to [0062], FIG. 3, etc.)).

In the hybrid AF method proposed in Japanese Patent Laid-Open Publication No. 2005-234325, one of the TV-AF method and the external phase difference detection method is selected for focus control, depending on the amount of change in each signal in the TV-AF method and the external phase difference detection method.

By performing focus detection by combining the hybrid AF method and the face detecting function, an image pickup apparatus is capable of not only performing stable focusing on a main human object, but also performing high-speed focusing from a state in which an image blur is occurring.

However, when an object is moving or when a camera shake by a photographer has occurred, it is not always possible to obtain an in-focus position of a focus lens for the face detection area by the phase difference detection method. Even in a case where stable focusing is being performed after detection of a human face, it sometimes occurs that when the in-focus position of the focus lens for the face detection area temporarily cannot be obtained but an in-focus position of the focus lens for a background is obtained, the focus lens is moved to the in-focus position of the focus lens for the background based on judgment that the current position of the focus lens is not close to the in-focus position of the focus lens for the face detection area. This makes a photographer feel uncomfortable.

Further, when the external phase difference detection method is employed, an optical system different from the main optical system of the photographic lens is used, which causes a parallax. For this reason, a face detection area on the screen, where a human face is detected, can differ from a ranging area determined by the external phase difference detection method. In this case, even when the face of a main human object is detected and stable focusing is being performed, the in-focus position of the focus lens obtained by the external phase difference detection method sometimes corresponds to a background object. In this case, it is judged that image blur has occurred, and the background object is focused, which discomforts a photographer. Further, when the face detection area for the main human object and the ranging area determined by the external phase difference detection method overlap each other, high-speed focusing is performed on the main human object, which can cause unstable focusing.

Further, in the case where high-speed focusing is performed from a state in which the entire screen is blurred, the face detection area for the main human object and the ranging area determined by the external phase difference detection method does not always coincide with each other. Therefore, if the two areas do not coincide with each other, it sometimes occurs that the background is focused first, and then the main human object is focused, which makes it impossible to perform stable focusing at high speed.

SUMMARY OF THE INVENTION

The present invention provides an image pickup apparatus which is capable of performing stable focusing on an object intended by a photographer, at high speed without discomforting the photographer, a method of controlling the image pickup apparatus, and a storage medium storing a program for implementing the method.

In a first aspect of the present invention, there is provided an image pickup apparatus comprising an image sensor for capturing an image signal formed by a photographic optical system that includes a focus lens, a detecting unit configured to detect an object area based on the image signal captured by the image sensor, a first generation unit configured to generate first information associated with a state of focus of the photographic optical system based on the image signal captured by the image sensor, and a control unit configured to control execution of at least one of a first focus control using the first information and a second focus control, depending on whether the object area is detected by the detecting unit.

In a second aspect of the present invention, there is provided an image pickup apparatus comprising an image sensor for capturing an image signal formed by a photographic optical system that includes a focus lens, a setting unit configured to set a to-be-focused object area of the image signal, and a control unit configured to control execution of a first focus control using first information associated with a state of focus of the photographic optical system based on an output signal from the image sensor and a second focus control using second information different from the first information, according to a position of the to-be-focused object area set by the setting unit.

In a third aspect of the present invention, there is provided a method of controlling an image pickup apparatus provided with an image sensor for capturing an image signal formed by a photographic optical system that includes a focus lens, the method comprising detecting whether an object area exists based on the image signal captured by the image sensor, generating first information associated with a state of focus of the photographic optical system based on an output signal from the image sensor, and controlling execution of at least one of a first focus control using the first information and a second focus control process, depending on whether an object area is detected.

In a fourth aspect of the present invention, there is provided a storage medium storing computer program code that, when executed on a computer, causes the computer to carry out a method of controlling an image pickup apparatus provided with an image sensor for capturing an image signal formed by a photographic optical system that includes a focus lens, wherein the method comprises detecting whether an object area exists based on the image signal captured by the image sensor, generating first information associated with a state of focus of the photographic optical system based on an output signal from the image sensor, and controlling execution of at least one of a first focus control using the first information and a second focus control process, depending on whether an object area is detected.

A desired advantage of embodiments of the present invention is that it is possible to perform stable focusing on an object intended by a photographer, at high speed without discomforting the photographer.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

First, a description will be given of an image pickup apparatus according to a first embodiment of the present invention. Although in the present embodiment, the image pickup apparatus is a video camera, this is not limitative, but another type of image pickup apparatus, such as a digital still camera, may be employed.

Figure 1:
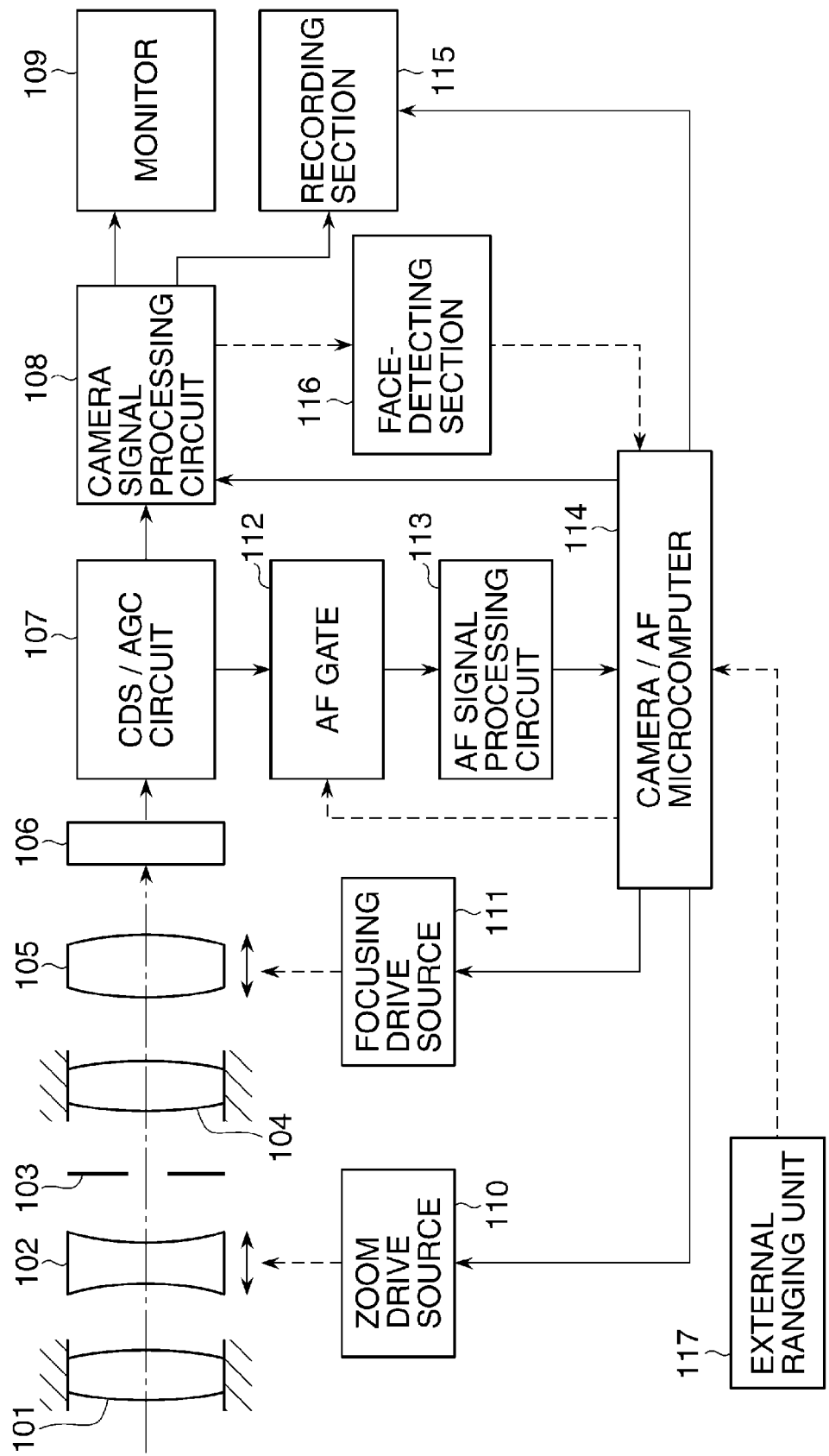
FIG. 1 is a block diagram of a main part of a video camera as an image pickup apparatus according to a first embodiment of the present invention.

FIG. 1 is a block diagram of a main part of the video camera as the image pickup apparatus according to the present embodiment.

Referring to FIG. 1, reference numeral 101 denotes a first fixed lens group; reference numeral 102, a variable power lens that performs a variable power or zooming operation while moving in an optical axis direction to vary a focal length; and reference numeral 103, a diaphragm. Further, reference numeral 104 denotes a second fixed lens group; and reference numeral 105, a focus compensator lens (hereinafter simply referred to as "the focus lens") equipped with both a function of correcting deviation of a focal plane due to a variable power operation and a focusing function. The first fixed lens group 101, the variable power lens 102, the diaphragm 103, the second fixed lens group 104, and the focus lens 105 constitute a photographic optical system.

Reference numeral 106 denotes an image pickup element as a photoelectric conversion element implemented by a CCD sensor or a CMOS sensor. The image pickup element 106 picks up an object image formed by the photographic optical system, and outputs a video signal indicative of the picked-up object image. Reference numeral 107 denotes a CDS/AGC circuit that samples the output from the image pickup element 106 and performs gain adjustment.

Reference numeral 108 denotes a camera signal processing circuit. The camera signal processing circuit 108 performs various kinds of image processing on an output signal from the CDS/AGC circuit 107 to generate a video signal. Reference numeral 109 denotes a monitor implemented by e.g. an LCD. The monitor 109 displays an image based on the video signal from the camera signal processing circuit 108. Reference numeral 115 denotes a recording section. In the recording section 115, the video signal from the camera signal processing circuit 108 is recorded on a recording medium, such as a magnetic tape, an optical disk, or a semiconductor memory.

Reference numeral 110 denotes a zoom drive source for moving the variable power lens 102. Reference numeral 111 denotes a focusing drive source for moving the focus lens 105. Each of the zoom drive source 110 and the focusing drive source 111 is formed by an actuator, such as a stepper motor, a DC motor, a vibration motor, or a voice coil motor.

Reference numeral 112 denotes an AF gate that passes only signals for an area for use in focus detection, of all pixel signals delivered from the CDS/AGC circuit 107.

An AF signal processing circuit 113 extracts a high-frequency component, a luminance difference component (difference between the maximum and minimum values of the luminance level of a signal having passed through the AF gate 112), and so forth from each signal having passed through the AF gate 112, to generate an AF evaluation value signal. The AF evaluation value signal is output to a camera/AF microcomputer (hereinafter simply referred to as "the microcomputer") 114. The AF evaluation value signal indicates the sharpness (contrast state) of a video signal generated based on the signal output from the image pickup element 106. The sharpness of the video signal changes according to the focus state of the photographic optical system, and therefore the AF evaluation value signal eventually indicates the focus state of the photographic optical system.

The microcomputer 114 controls the overall operation of the video camera, and performs focus control for controlling the focusing drive source 111 to move the focus lens 105. The microcomputer 114 executes the focus control by the TV-AF method (hereinafter simply referred to as "the TV-AF").

A face-detecting section 116 performs known human face detection processing on the video signal to detect a human face area in an image pickup screen. The result of the detection is sent to the microcomputer 114. The microcomputer 114 sends information to the AF gate 112 so that an area for focus detection will be added to a position including the face area within the image pickup screen, based on the detection result.

It should be noted that for a human face-detecting process, there have been disclosed e.g. a method in which a pale peach color area is extracted based on gradation colors of pixels represented by image data, and a human face is detected based on the degree of matching between the pale peach color areas and a face contour plate provided in advance, and a method in which human face detection is performed by extracting feature points of a face including eyes, a nose, and a mouth using a well-known pattern recognition technique. In the present embodiment, the method of the human face detection is not limited to the above-described one, but any other suitable method may be employed.

Reference numeral 117 denotes an external ranging unit. The external ranging unit 117 may employ any of the conventional external phase difference detection method, an ultrasonic sensor method, an infrared sensor method, and so forth. Ranging information and information on ranging reliability from the external ranging unit 117 are captured into the microcomputer 114 to be converted into information on the in-focus position of the focus lens 105. As for ranging reliability, in the case of the external phase difference detection method, for example, ranging is performed based on the amount of relative positional shift between divided optical fluxes in an optical flux-dividing direction, and hence the correlation between two split images is generally regarded as ranging reliability.

Next, a description will be given of a focus control process executed by the microcomputer 114.

Figure 2:
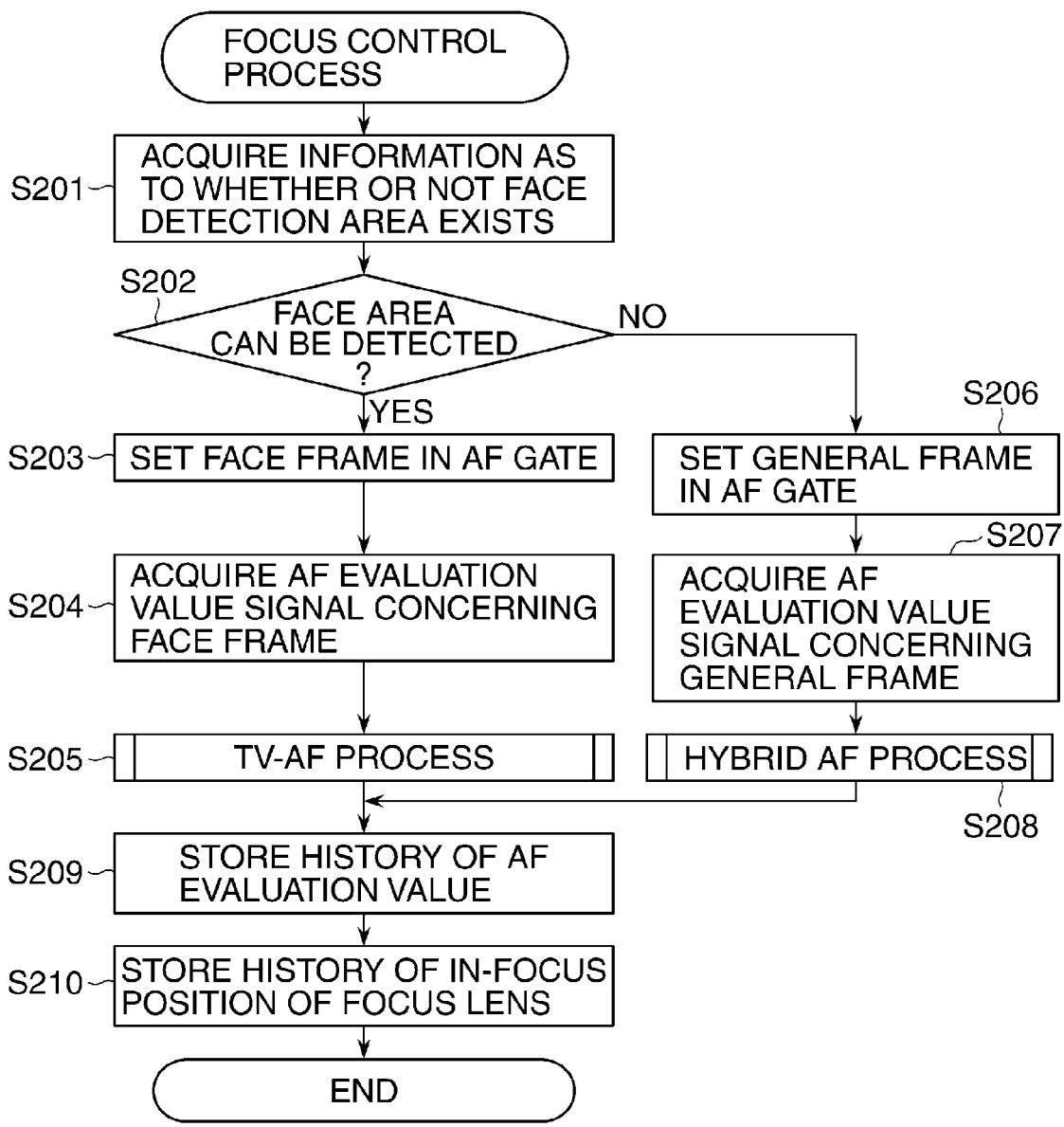
FIG. 2 is a flowchart of a focus control process executed by a microcomputer appearing in FIG. 1.

FIG. 2 is a flowchart of the focus control process executed by the microcomputer 114 appearing in FIG. 1. The present process is repeatedly executed, based on a computer program stored in the microcomputer 114, at time intervals at which an image pickup signal is read out from the image pickup element 106 so as to generate e.g. a one-field image.

Referring to FIG. 2, first, information indicative of whether or not a face detection area exists is acquired from the face-detecting section 116 that has executed human face detection on a latest video signal (step S201).

Then, it is determined, based on the acquired information, whether or not a human face area can be detected by the face-detecting section 116 (step S202).

If it is determined in the step S202 that a human face area can be detected by the face-detecting section 116 (YES to the step S202), a predetermined AF frame (hereinafter simply referred to as "the face frame" and serving an example of "a first focus detection area" in the appended claims) is automatically set in the AF gate 112 by the microcomputer 114, based on position information of a position in the image pickup screen where a human face is detected (step S203). The face frame is controlled to follow after an object to be photographed an image of which includes the face detection area. The position information may be information indicative of the central position of the area where the human face is detected or the position of a feature point, such as eyes, a nose, or a mouth, of a face.

Then, an AF evaluation value signal (an example of "first focus area information" in the appended claims) concerning the face frame, which is output from the AF signal processing circuit 113, is acquired (step S204) (an example of operation of "a first generation unit" in the appended claims).

Figure 3:
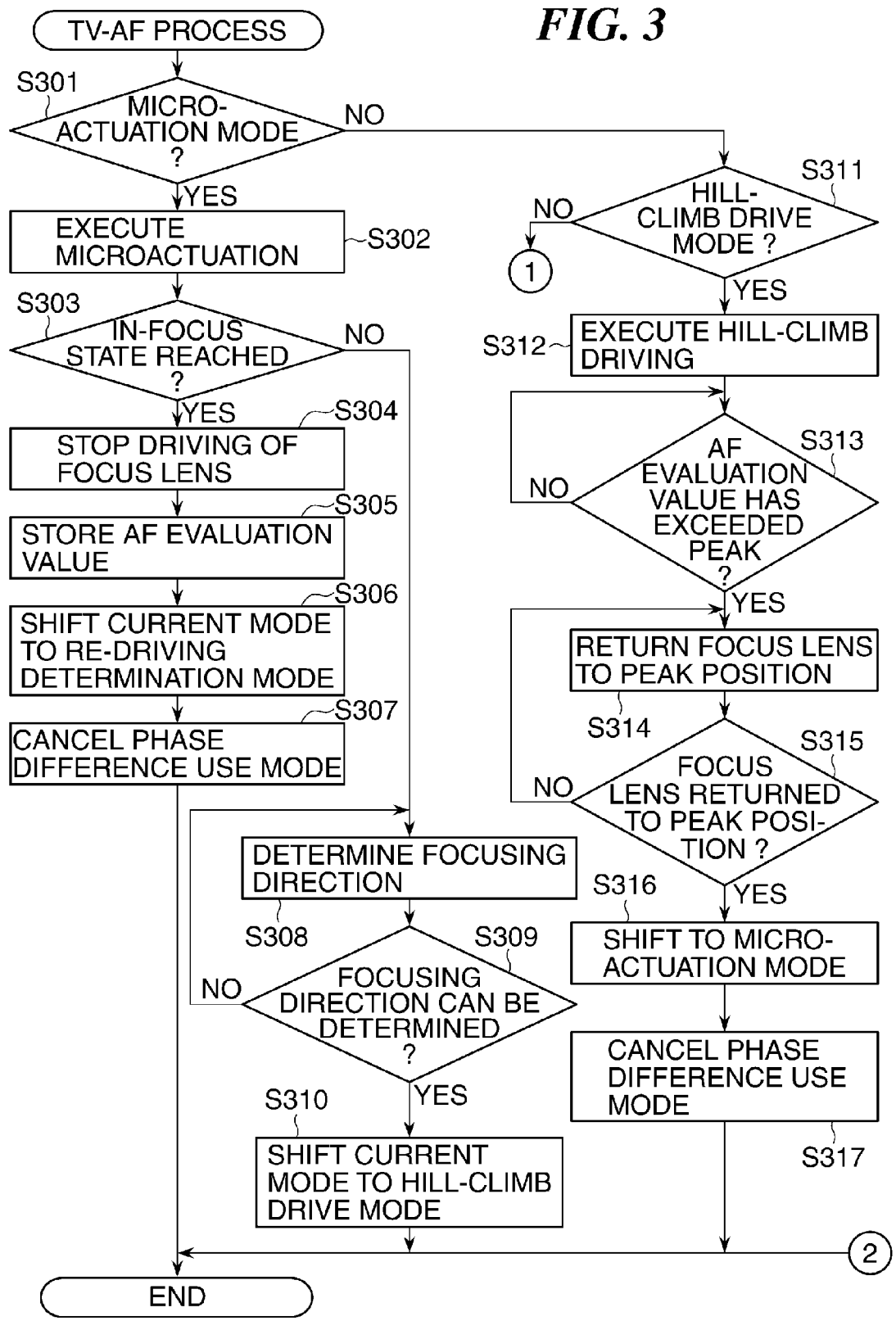
FIG. 3 is a flowchart of a TV-AF process executed in a step in the focus control process in FIG. 2.
Figure 4:
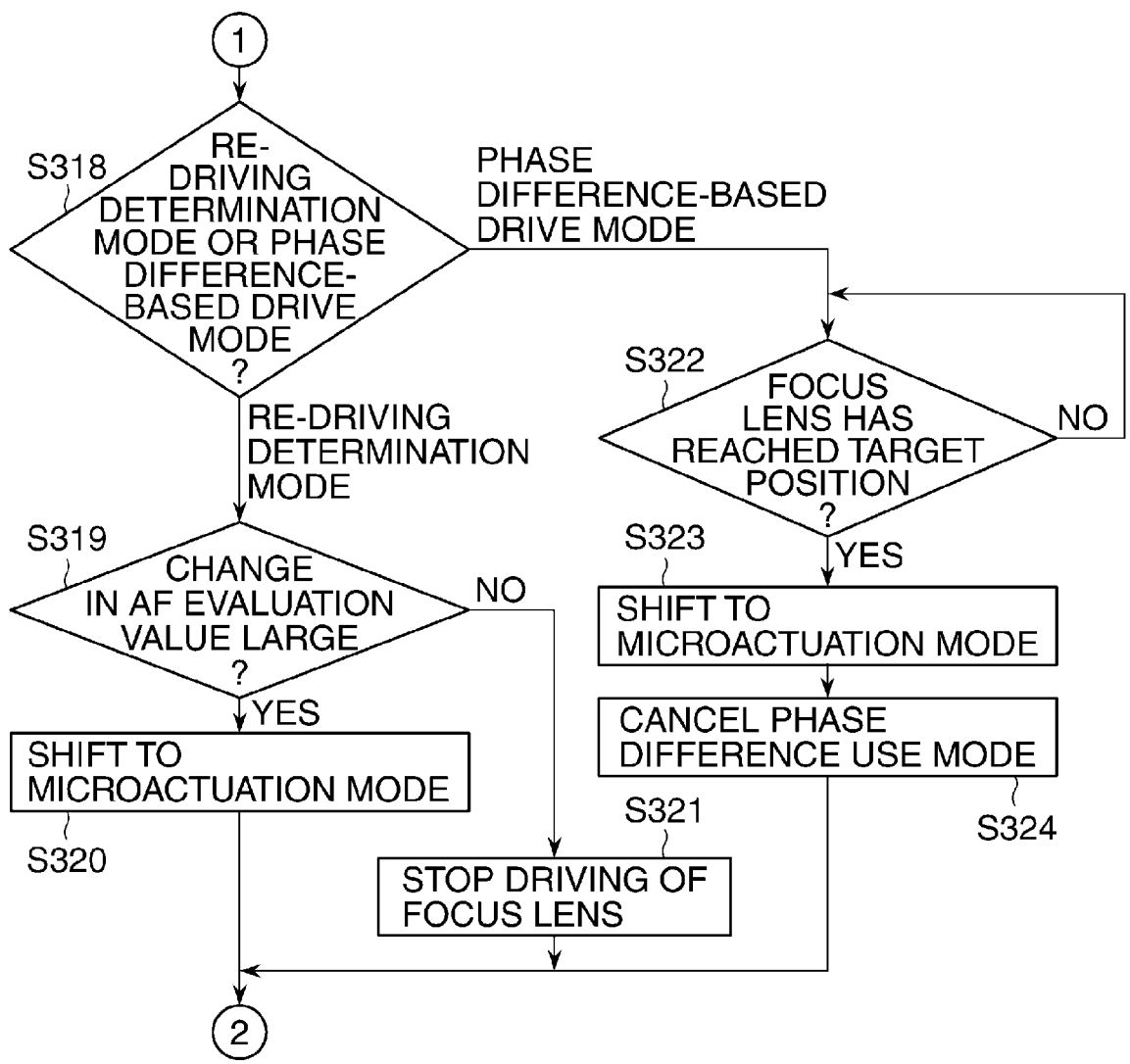
FIG. 4 is a continuation of FIG. 3.

Then, a TV-AF process (an example of "first focus control" in the appended claims) hereinafter described with reference to FIGS. 3 and 4 is executed using an AF evaluation value (an example of "first information" in the appended claims) of the acquired AF evaluation value signal concerning the face frame (step S205). In other words, the sharpness or contrast of the detected face is measured in order to find an in-focus (i.e. sharpest) position of the focus lens in the optical system. In the TV-AF process in FIGS. 3 and 4, an in-focus state is obtained by adjusting a focus by driving the focus lens 105 while monitoring the AF evaluation value, such that the AF evaluation value reaches a maximum value (sharpest image). In the TV-AF process described hereinafter with reference to FIGS. 3 and 4, whether or not re-driving of the focus lens 105 is required is determined under conditions where an in-focus state is achieved, and hence there is also included processing for maintaining the in-focus state, such as determination of whether or not lowering of the AF evaluation value occurs after the maximum value has been achieved and set as the in-focus state.

If it is determined in the step S202 of FIG. 2 that the face-detecting section 116 cannot detect a human face area (NO to the step S202), a fixed AF frame with its center aligned with the central part of the image pickup screen (hereinafter simply referred to as "the normal frame" or the "general frame" and serving as an example of "a second focus detection area" in the appended claims) is set in the AF gate 112 (step S206).

Then, an AF evaluation value signal (an example of "second focus area information" in the appended claims) concerning the normal frame, which is output from the AF signal processing circuit 113 is acquired (step S207).

Figure 5:
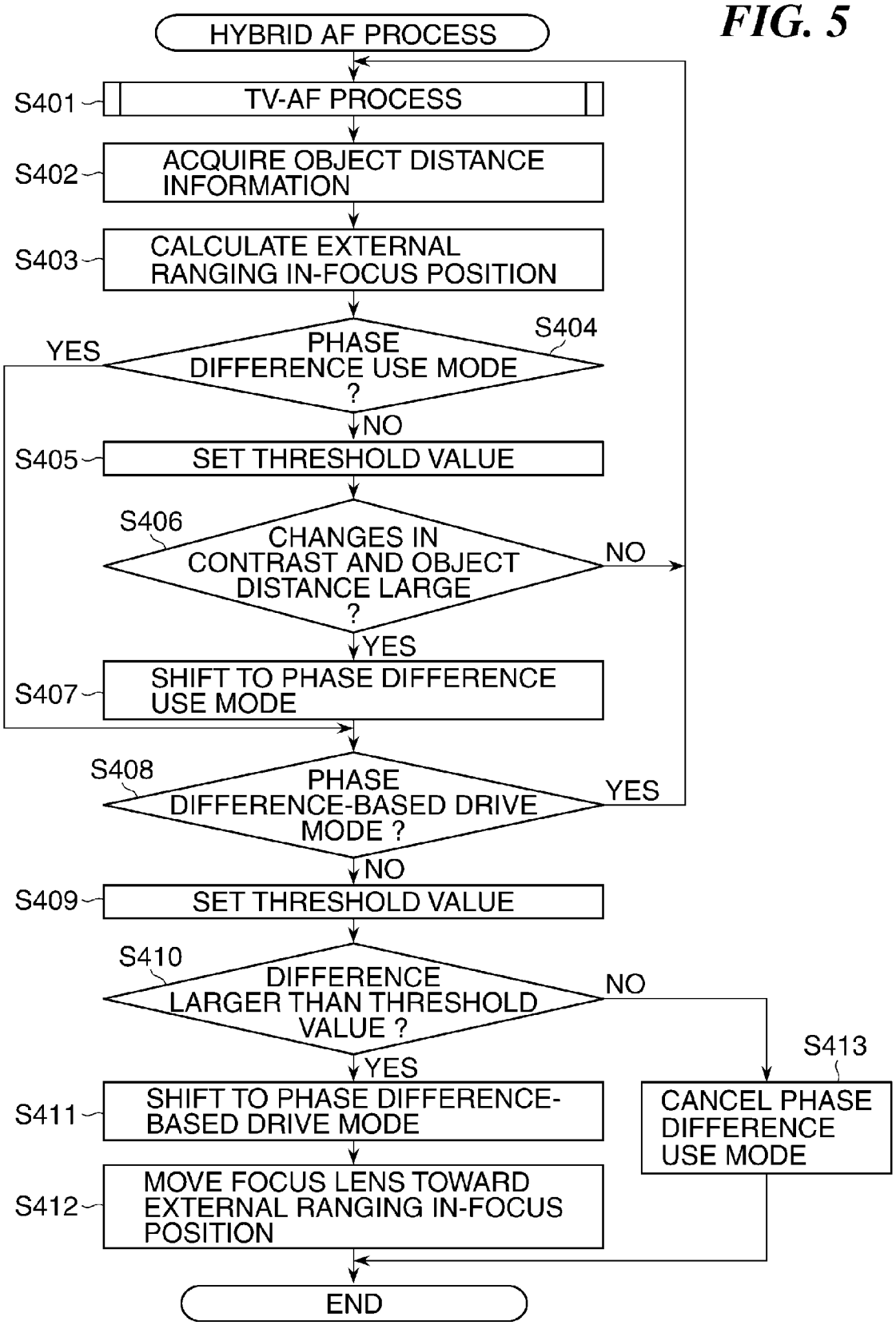
FIG. 5 is a flowchart of a hybrid AF process executed in a step in the focus control process in FIG. 2.

Then, a focus control process by the hybrid AF method (hereinafter simply referred to as "the hybrid AF process"), which will be described hereinafter with reference to FIG. 5, is executed using the AF evaluation value of the acquired AF evaluation value signal concerning the normal area (step S208). In the hybrid AF process in FIG. 5, focusing is performed using a combination of the TV-AF method and the phase difference detection method.

After execution of the step S205 or S208, history of the AF evaluation value acquired from the AF frame set in the AF gate 112 is stored as history information (step S209).

Then, history of the acquired in-focus position of the focus lens 105 is stored as history information (step S210), followed by terminating the present process.

FIGS. 3 and 4 are a flowchart of the TV-AF process executed in the step S205 in the focus control process shown in FIG. 2. The present process is also executed in a step S401 in the hybrid AF process described hereinafter with reference to FIG. 5, and hence, the flowchart in FIGS. 3 and 4 is presented while taking a case where the TV-AF process is executed in the FIG. 5 hybrid AF process into consideration.

Referring to FIG. 3, first, it is determined whether or not the mode of the TV-AF is a microactuation mode (step S301). The microactuation mode will be described hereinafter.

If it is determined in the step S301 that the mode of the TV-AF is the microactuation mode (YES to the step S301), microactuation of the focus lens 105 is caused (step S302). The microactuation will be described hereinafter with reference to FIG. 10.

Then, it is determined whether or not an in-focus state has been reached (step S303).

If it is determined in the step S303 that an in-focus state has been reached (YES to the step S303), the microactuation of the focus lens 105 is stopped (step S304).

Then, an AF evaluation value associated with the in-focus position of the focus lens 105 is stored in a memory (not shown) of the microcomputer 114 (step S305).

Then, the present mode is changed to a re-driving determination mode (step S306).

Then, a phase difference use mode is canceled (step S307). The phase difference use mode is for permitting, only when specific conditions are satisfied, execution of the focus control by the external ranging phase difference detection method (hereinafter referred to as "the external ranging AF"), for moving the focus lens 105 to the external ranging in-focus position is permitted. The phase difference use mode is canceled in the step S307 because as a result of the in-focus determination performed by the TV-AF, the focus lens 105 has already been stopped, and it is required to prevent the focus lens 105 from being moved to an external ranging in-focus position by the external ranging AF which could cause unnecessary blur of a video image.

If it is determined in the step S303 that the in-focus state has not been reached (NO to the step S303), it is determined in which direction the focus lens 105 is to be moved from the current position thereof so as to cause the same to reach the in-focus position (step S308).

Then, it is determined whether or not the direction (hereinafter referred to as "the focusing direction") in which the focus lens 105 is to be moved so as to cause the same to reach the in-focus position could be determined in the step S308 (step S309).

If it is determined in the step S309 that the focusing direction could not be determined (NO to the step S309), the process returns to the step S308. If it is determined that the focusing direction could be determined (YES to the step S309), the mode of the TV-AF is changed to a hill-climb drive mode (step S310), described below with reference to FIG. 11.

If it is determined in the step S301 that the mode of the TV-AF is not the microactuation mode (NO to the step S301), it is determined whether or not the mode of the TV-AF is the hill-climb drive mode (step S311).

If it is determined in the step S311 that the mode of the TV-AF is the hill-climb drive mode (YES to the step S311), the focus lens 105 is hill-climb driven (i.e. subjected to in-focus position detection control) at a predetermined speed (step S312).

Then, it is determined whether or not the AF evaluation value has exceeded its peak in the hill-climb driving of the focus lens 105 (step S313).

If it is determined in the step S313 that the AF evaluation value has exceeded its peak (YES to the step S313), the focus lens 105 is returned to a position where the AF evaluation value reached the peak (hereinafter referred to as "the peak position") in the hill-climb driving of the focus lens 105 (step S314).

Then, it is determined whether or not the focus lens 105 has been returned to the peak position (step S315).

If it is determined in the step S315 that the focus lens 105 has not been returned to the peak position (NO to the step S315), the process returns to the step S314, whereas if the focus lens 105 has been returned to the peak position (YES to the step S315), the mode of the TV-AF is changed to the microactuation mode (step S316).

Then, the phase difference use mode is canceled (step S317). At this time, the in-focus position (peak position) in the hill-climb drive mode has been determined, and the focus lens 105 has been moved to the in-focus position. Therefore, the step S317 is executed to prevent the focus lens 105 from being driven to the external ranging in-focus position by the external ranging AF, which may cause unnecessary blur of a video image.

If it is determined in the step S311 that the mode of the TV-AF is not the hill-climb drive mode (NO to the step S311), the process proceeds to a step S318 in FIG. 4, wherein it is determined whether the current mode is the re-driving determination mode or a phase difference-based drive mode (step S318).

If it is determined in the step S318 that the current mode is the re-driving determination mode, the process proceeds to a step S319, wherein through comparison between the AF evaluation value stored in the memory (not shown) of the microcomputer 114 and the current AF evaluation value, it is determined whether or not the difference between the two AF evaluation values is larger than a predetermined value, i.e. whether or not the change in the AF evaluation value is large.

If it is determined in the step S319 that the change in the AF evaluation value is large (YES to the step S319), the mode of the TV-AF is changed to the microactuation mode (step S320).

If it is determined in the step S319 that the change in the AF evaluation value is small (NO to the step S319), the driving of the focus lens 105 is stopped (step S321).

If it is determined in the step S318 that the mode is the phase difference-based drive mode, i.e. if the focus lens 105 is being moved toward the external ranging in-focus position, the external ranging in-focus position is set as a target position, and it is determined whether or not the focus lens 105 has reached the target position (step S322).

If it is determined in the step S322 that the focus lens 105 has reached the target position (YES to the step S322), the current mode is shifted to the microactuation mode (step S323). More specifically, the mode is shifted to the microactuation mode of the TV-AF from the external ranging AF.

Then, the phase difference-based drive mode is canceled (step S324).

After execution of the step S307, S310, S317, S320, S321, or S324, the present process is terminated.

Figure 10:
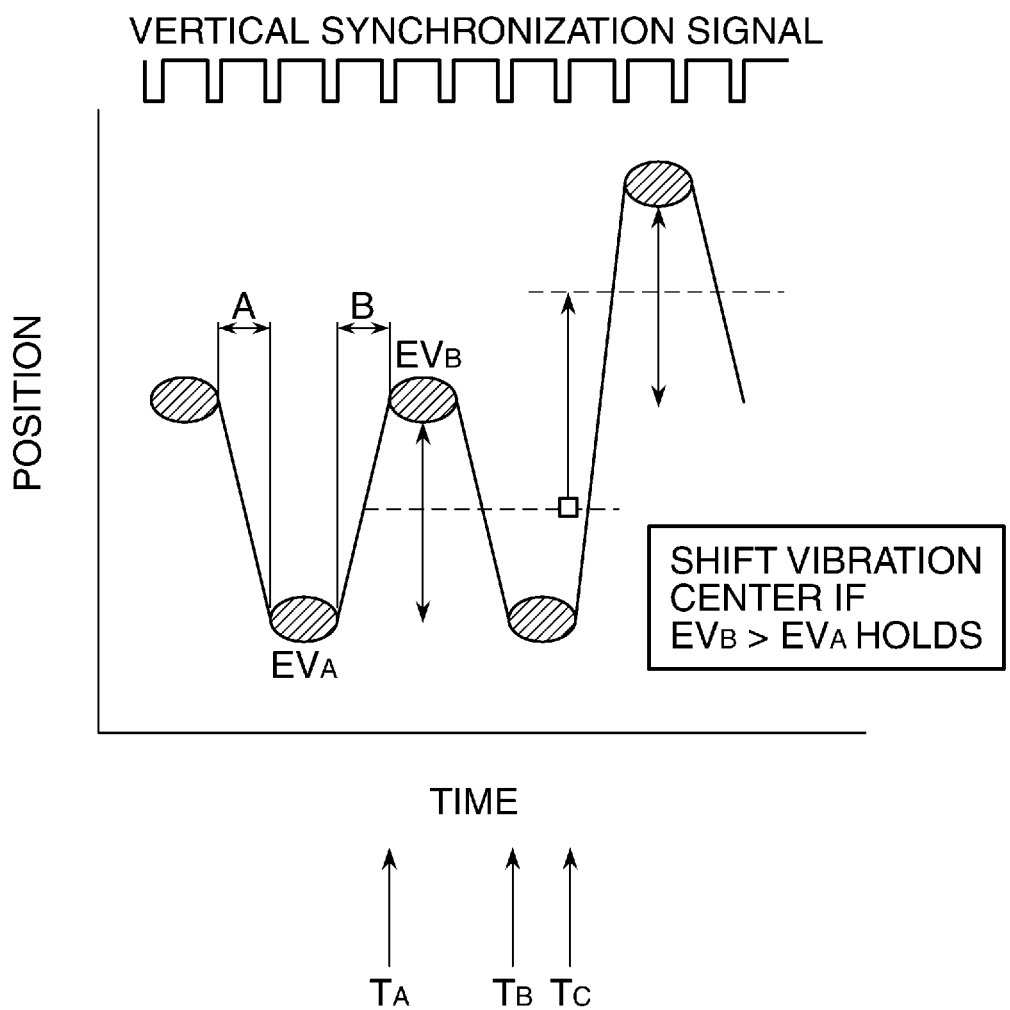
FIG. 10 is a diagram useful in explaining microactuation of a focus lens, which is executed in a step in the TV-AF process in FIG. 3.

FIG. 10 is a diagram useful in explaining the microactuation of the focus lens 105, which is executed in the step S302 in the TV-AF process in FIG. 3.

Referring to FIG. 10, the horizontal axis represents time, and the vertical axis represents the position of the focus lens 105. Further, in an upper part of FIG. 10 is shown a vertical synchronization signal of the video signal.

As shown in FIG. 10, an AF evaluation value $EV_A$ associated with electric charge (indicated by a hatched ellipse in FIG. 10) accumulated in the image pickup element 106 during a time period A is captured at a time $T_A$, and an AF evaluation value $EV_B$ associated with electric charge accumulated in the image pickup element 106 during a time period B is captured at a time $T_B$. Further, at a time $T_C$, the AF evaluation values $EV_A$ and $EV_B$ are compared with each other, and if $EV_B>EV_A$, a driving (vibration) center of microactuation is shifted. On the other hand, if $EV_A>EV_B$, the vibration center is not shifted. The microactuation is an operation for determining a direction of movement of the focus lens 105 which increases the AF evaluation value or for locating a position (peak position) of the focus lens 105, where the AF evaluation value becomes maximum, while moving the focus lens 105, as described above.

The control for microactuation of the focus lens 105 so as to determine, based on a change in the AF evaluation value, whether or not the in-focus state has been reached can be referred to as in-focus check control.

Further, the control for microactuation of the focus lens 105 so as to determine, based on a change in the AF evaluation value, a focusing direction can be referred to as focusing direction determination control.

Figure 11:
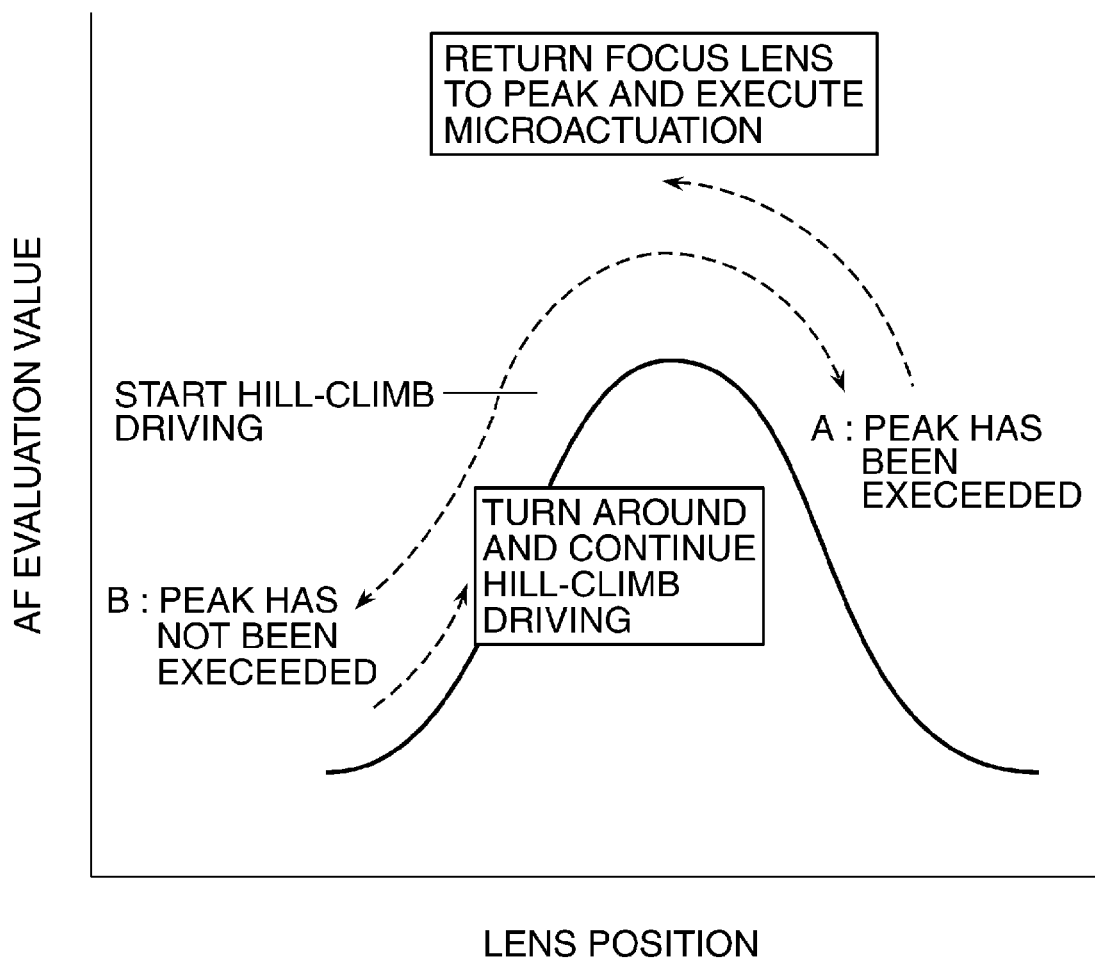
FIG. 11 is a diagram useful in explaining a hill-climb driving of the focus lens, which is executed in a step in the TV-AF process in FIG. 3.

FIG. 11 is a diagram useful in explaining the hill-climb driving of the focus lens 105, which is executed in the step S311 in the TV-AF process in FIG. 3.

In FIG. 11, the horizontal axis represents the position of the focus lens 105, and the vertical axis represents the AF evaluation value.

As shown in FIG. 11, in a movement indicated by A, the AF evaluation value exceeds its peak and then decreases, and hence it is possible to confirm the existence of the peak position (in-focus position). In this case, the focus lens 105 is returned close to the peak position, and then the hill-climb driving is terminated, whereafter the driving operation is switched to the microactuation. On the other hand, in a movement indicated by B, the AF evaluation value monotonously decreases without reaching the peak, and hence it is possible to determine that the focus lens 105 is being driven in a wrong direction. In this case, the direction in which the focus lens 105 is driven is reversed, and then the hill-climb driving is continued. As described above, the hill-climb driving is an operation for determining a peak position where the AF evaluation value obtained during driving of the focus lens 105 becomes maximum or determining a position close to the peak position, while moving the focus lens 105.

FIG. 5 is a flowchart of the hybrid AF process executed in the step S208 in the focus control process in FIG. 2.

As shown in FIG. 5, first, the TV-AF process shown in FIGS. 3 and 4 is executed (step S401). In the TV-AF process, an in-focus state is reached by driving the focus lens 105 while monitoring the AF evaluation value, and then so as to determine the necessity of re-driving of the focus lens 105 in the state where the in-focus state has been reached, it is determined whether or not the AF evaluation value has decreased. Thus, the TV-AF process includes processing for maintaining the in-focus state.

Then, object distance information (an example of "second information" in the appended claims) is acquired from the external ranging unit 117 (step S402) (an example of operation of "a second generation unit" in the appended claims).

Then, the external ranging in-focus position is calculated based on the acquired object distance information (step S403).

Then, it is determined whether or not the current mode is the phase difference use mode (step S404).

If it is determined in the step S404 that the current mode is not the phase difference use mode (NO to the step S404), threshold values are set for use in determining whether or not changes in contrast and object distance are large (step S405).

Then, whether or not changes in contrast and object distance are large is determined using contrast information, the object distance information, and the threshold values (step S406). More specifically, it is determined whether or not a change between contrast information acquired in the immediately preceding loop and contrast information acquired in the present loop is larger than an associated threshold value. At the same time, it is determined whether or not a change between object distance information acquired in the immediately preceding loop and object distance information acquired in the present loop is larger than an associated threshold value.

In the present embodiment, the microcomputer 114 determines the difference between the maximum value and the minimum value of the luminance level at each pixel line based on the signal having passed through the AF gate 112, which are obtained from the AF signal processing circuit 113, and uses the maximum value of the differences as the contrast information. The AF evaluation value, which also indicates a contrast state as the contrast information does, may be compared with a threshold value in place of the contrast information.

If it is determined in the step S406 that the changes in contrast and object distance are large (YES to the step S406), the current mode is shifted to the phase difference use mode (step S407).

On the other hand, if it is determined in the step S406 that at least one of the changes in contrast and object distance is small (NO to the step S406), the process returns to the step S401. More specifically, if at least one of the changes in contrast and object distance is small, only the TV-AF process is repeatedly executed at the above-mentioned time intervals for reading out an image pickup signal.

Although in the present embodiment, determination is performed as to whether or not the change in the object distance information is larger than the associated threshold value, a change of the external ranging in-focus position calculated in the step S403 based on the object distance information may be used for determination in the step S406. This determination is equivalent to the determination as to the change in the object distance information.

It should be noted that the step S406 is executed as a first determination step for moving the focus lens 105 based on the object distance information (or the external ranging in-focus position information), i.e. for determining whether or not to perform the external ranging AF. In short, the conditions (timing) for driving the focus lens 105 by the external ranging AF are limited to a case where not only the contrast state of the object but also the object distance has largely changed.

As a consequence, when the AF evaluation value has largely changed due to a change in a pattern or the like of the object in spite of the fact that the object distance has not largely changed and the object is in focus, it is possible to prevent occurrence of blur of a video image due to the unnecessary shift of the position of the focus lens 105 to the external ranging in-focus position, which is conventionally caused by moving the focus lens 105 to the external ranging in-focus position in such a case.

If it is determined in the step S404 that the current mode is the phase difference use mode (YES to the step S404), or after the step S407 is executed, it is determined whether or not the current mode is the phase difference-based drive mode (step S408).

If it is determined in the step S408 that the current mode is the phase difference-based drive mode, i.e. if the mode has already been set to the phase difference-based drive mode and the focus lens 105 is being moved toward the external ranging in-focus position (YES to the step S408), the process returns to the step S401.

On the other hand, if it is determined in the step S408 that the current mode is not the phase difference-based drive mode (NO to the step S408), a focus shift amount threshold value is set for use in determining whether to move the focus lens 105 to the external ranging in-focus position, i.e. whether or not to execute the external ranging AF (step S409). This threshold value is set in consideration of variations in object distance detection by the external ranging unit 117.

Then, the difference (absolute value) between the external ranging in-focus position obtained in the step S403 and the current position of the focus lens 105 is calculated, and it is determined whether or not the difference is larger than the focus shift amount threshold value set in the step S409 (step S410).

The step S410 is executed as a second determination step for determining whether or not to perform the external ranging AF. In short, the conditions (timing) for driving the focus lens 105 by the external ranging AF are limited to a case where the difference between the external ranging in-focus position and the current position of the focus lens 105 is large.

When the conditions for use in the determination in the second determination step are not satisfied, the external ranging AF is not performed because the external ranging AF is inferior in the accuracy of focusing to the TV-AF. If the focus lens 105 is carelessly moved to the external ranging in-focus position, hunting between the TV-AF and the external ranging AF or blur of a video image is caused.

If it is determined in the step S410 that the difference is larger than the focus shift amount threshold value (YES to the step S410), the current mode is shifted to the phase difference-based drive mode (step S411).

Then, the focus lens 105 is moved toward the external ranging in-focus position (step S412).

On the other hand, if it is determined in the step S410 that the difference is smaller than the focus shift amount threshold value (NO to the step S410), the phase difference use mode is canceled (step S413).

After execution of the step S412 or S413, the present process is terminated.

It is to be understood that the AF switching in the hybrid AF process is described only by way of example, and hence the method of switching between the TV-AF and the external ranging AF is not limited to the above described one.

According to the focus control process in FIG. 2, since it is not always possible to acquire the in-focus position of the focus lens 105 in a face detection area by the phase difference detection method, the focus control method is selected (restricted) according to whether or not a human face has been detected. As a consequence, during stable focusing after detection of a human face, when the phase difference detection method cannot temporarily determine an in-focus position of the focus lens 105 for a face detection area but determines an in-focus position of the same for a background, it is possible to prevent the focus lens 105 from being moved to the in-focus position for the background due to determination that the focus lens 105 is not positioned close to the in-focus position for the face detection area. Further, in the face detection processing which is executed based on one image, face detection frequency is lower when an object is not in focus, whereas when the focus lens 105 is positioned close to the in-focus position, face detection frequency is higher. Therefore, when a human face is detected, it is preferable to determine that the focus lens 105 has already been positioned close to the in-focus position, and perform stable and high-accuracy focusing only by the TV-AF method. A case where no face has been detected corresponds to a case where the focus lens 105 is not positioned close to the in-focus position, or a case where no main human object exists within the image. The hybrid AF control increases responsiveness when the focus lens 105 is not positioned close to the in-focus position, and performs stable and high-accuracy focusing when the focus lens 105 is positioned close to the in-focus position. This enables a photographer to perform stable and high-accuracy focusing control, with enhanced responsiveness, for focusing a main object, to thereby suppress the photographer's discomfort.

Next, a description will be given of variations of the focus control process executed by the microcomputer 114.

First, a first variation of the focus control process will be described.

Figure 6:
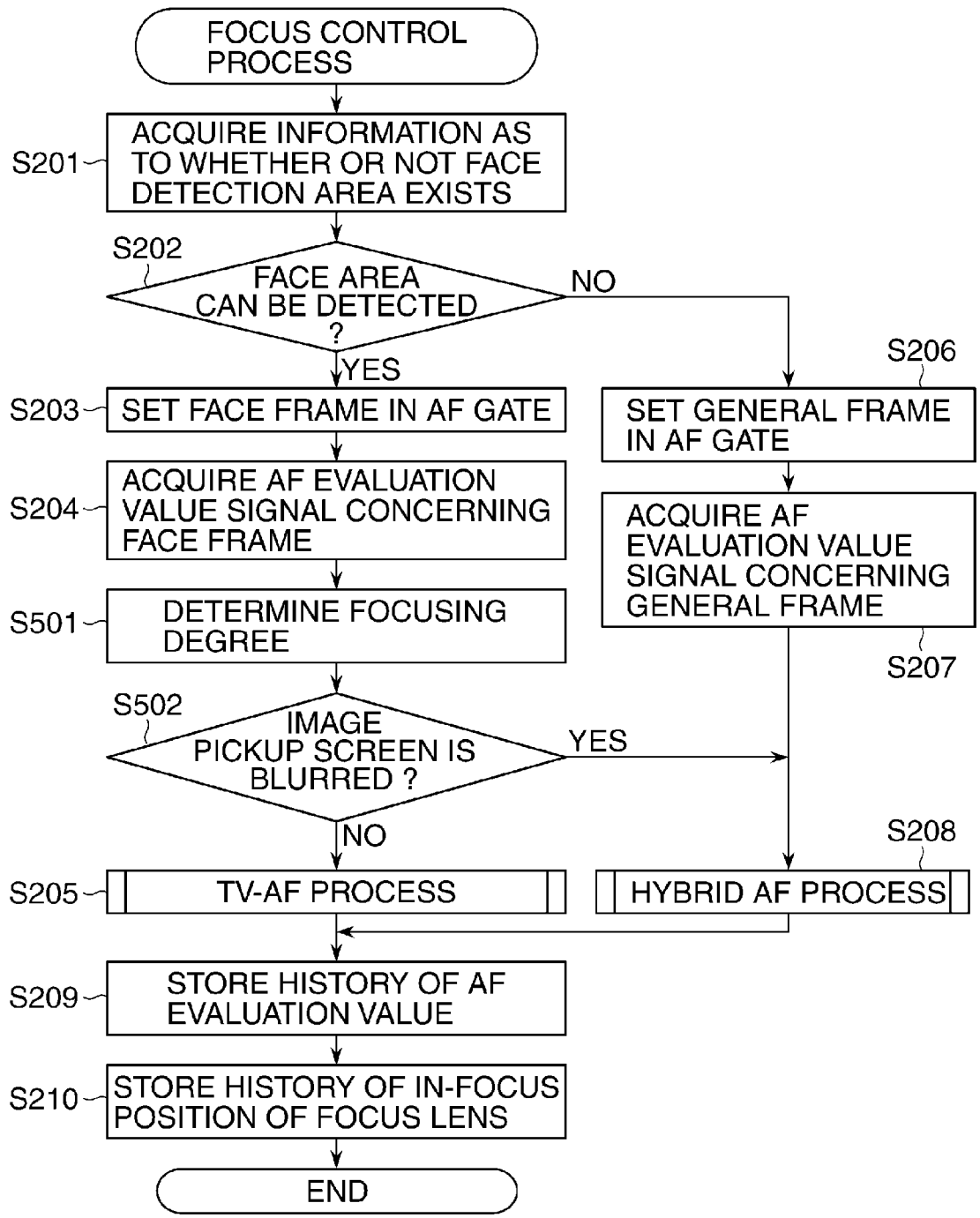
FIG. 6 is a flowchart of a first variation of the focus control process in FIG. 2.

FIG. 6 is a flowchart of the first variation of the focus control process in FIG. 2.

The process in FIG. 6 is basically the same as that in FIG. 2. Therefore, steps identical to those in FIG. 2 are denoted by identical step numbers, and duplicate description thereof is omitted. In the following, a description will be given of only different points from the process in FIG. 2.

In the FIG. 6 process, when a face area can be detected in the FIG. 2 process, the degree of focusing is determined based on the AF evaluation value, whereby it is determined whether or not the focus lens 105 is positioned close to the in-focus position.

As shown in FIG. 6, after execution of the step S204, simplified focusing degree determination is performed using the AF evaluation value of the acquired AF evaluation value signal concerning the face frame (step S501). The determination in the step S501 may be simple insofar as it is possible to determine occurrence of image blur, using a luminance signal of a picked-up video image, when predetermined high-frequency components of the signal cannot be obtained in spite of presence of contrast in the picked-up video image. For example, a method may be employed in which (the maximum value of the output of high-frequency components of each line) is divided by (the maximum value of the difference between the maximum and minimum values of the luminance signal for each line), and obtained results are represented by classification levels from 1 to 10.

Then, it is determined, based on the result of the determination in the step S501, whether or not the image pickup screen is blurred (step S502).

If it is determined in the step S502 that the focus lens 105 is positioned close to the in-focus position, i.e. if the image pickup screen is not blurred (NO to the step S502), the TV-AF process in the step S205 is executed.

On the other hand, if it is determined in the step S502 that the image pickup screen is blurred (YES to the step S502), the hybrid AF process in the step S208 is executed.

In general, in a case where a face area has been detected, when an image pickup screen is blurred, it is possible that the face area has been erroneously detected. In this case, focusing is delayed by the time taken to cope with the erroneous detection. Further, when an object is out of focus, if focusing is performed only by the TV-AF process, it takes time to reach an in-focus state, which makes the photographer feel uncomfortable. Therefore, it is effective to move the focus lens close to the in-focus position by the hybrid AF method.

According to the focus control process in FIG. 6, it is possible to perform stable and high-speed focusing on an object intended by the photographer.

Next, a description will be given of a second variation of the focus control process.

Figure 7:
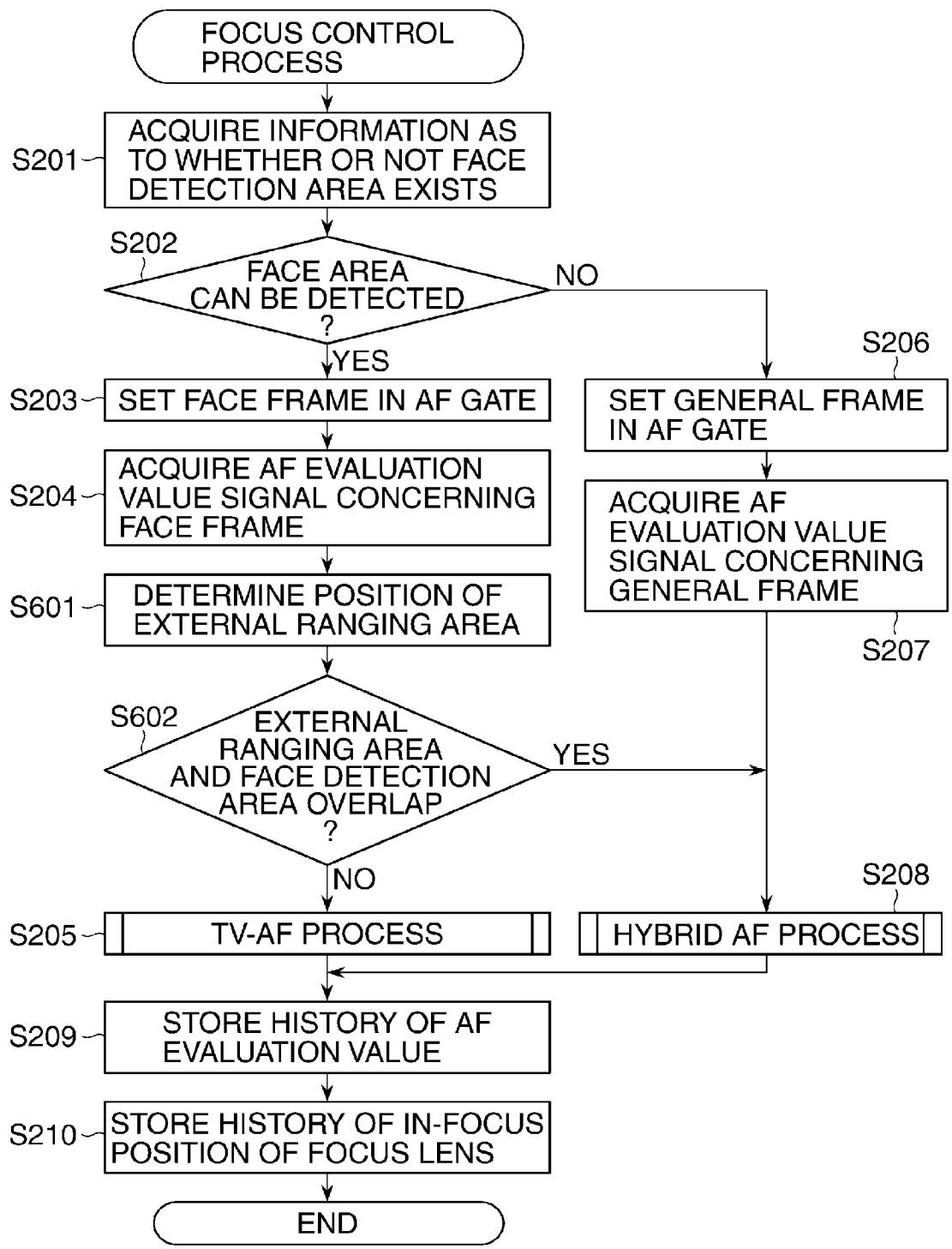
FIG. 7 is a flowchart of a second variation of the focus control process in FIG. 2.

FIG. 7 is a flowchart of the second variation of the focus control process in FIG. 2.

The process in FIG. 7 is basically the same as that in FIG. 2. Therefore, steps identical to those in FIG. 2 are denoted by identical step numbers, and duplicate description thereof is omitted. In the following, a description will be given of only different points from the process in FIG. 2.

In the FIG. 7 process, when a face area can be detected in the FIG. 2 process, it is determined whether or not a focus detection area and an external ranging area overlap each other.

Figure 12C:
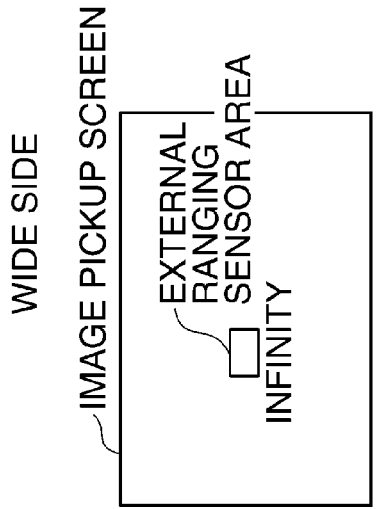
FIG. 12C is a view showing a wide-side image pickup screen, which is useful in explaining the case where the video camera has the external ranging sensor mounted therein.
Figure 12C:
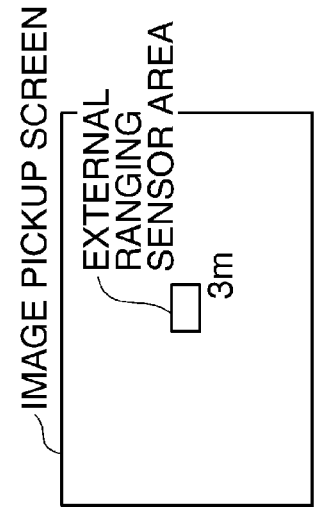
Figure 12C:
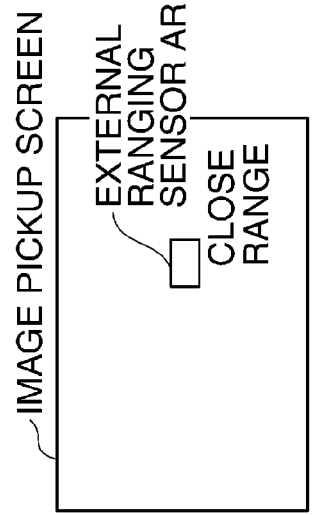
Figure 12B:
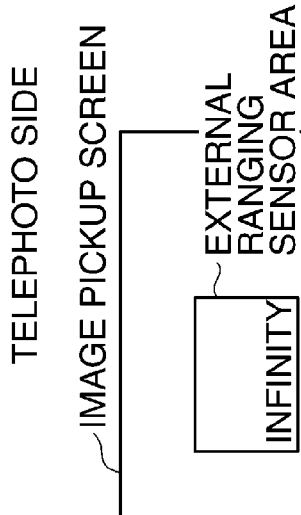
FIG. 12B is a view showing a telephoto-side image pickup screen, which is useful in explaining the case where the video camera has the external ranging sensor mounted therein.
Figure 12B:
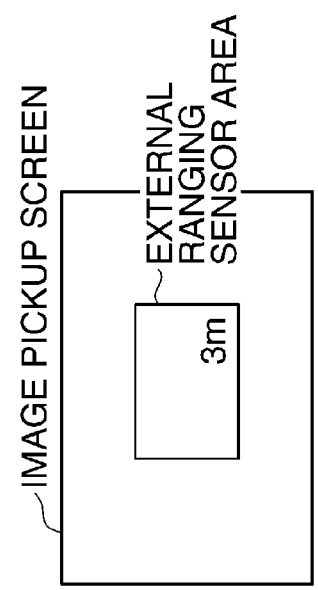
Figure 12B:
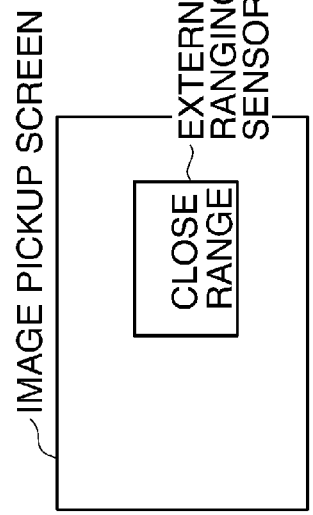
Figure 12A:
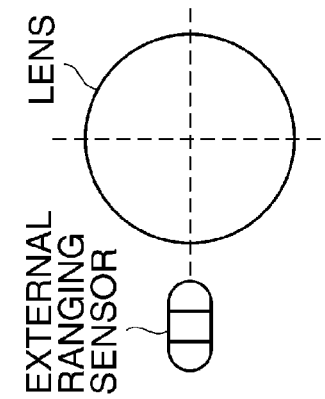
FIG. 12A is a view showing the relationship between an external ranging sensor and a lens, which is useful in explaining a case where the video camera has the external ranging sensor mounted therein.

As shown in FIG. 7, after execution of the step S204, it is determined based on a focal length, where on the screen the external ranging area exists (step S601). In the step S601, the determination may be performed not only based on the focal length, but also based on an object distance acquired by an external ranging sensor. Specifically, assuming, for example, that the video camera is configured such that an object is in a central part of the screen when the object distance is 3 m, if the external ranging sensor is mounted with respect to a photographic lens as shown in FIG. 12A, the size of the external ranging area occupying the screen differs between a telephoto side shown in FIG. 12B and a wide side shown in 12C, and is smaller on the wide side. Further, the position of the external ranging area changes depending on whether the object distance is on a close range side or on an infinity side. When the object distance is on the close range side, the external ranging area is positioned rightward of the screen center of the image pickup screen, whereas when the object distance is on the infinity side, the external ranging area is positioned leftward of the screen center of the image pickup screen.

Then, it is determined whether or not the external ranging area determined in the step S601 and the face detection area overlap each other (step S602).

If it is determined in the step S602 that the external ranging area and the face detection area do not overlap (NO to the step S602), the TV-AF process in the step S205 is executed.

On the other hand, if it is determined in the step S602 that the external ranging area and the face detection area overlap each other (YES to the step S602), the hybrid AF process in the step S208 is executed.

According to the focus control process in FIG. 7, when the external ranging area and the face detection area overlap each other, a main human object is also captured in the in-focus position of the focus lens determined by the external ranging method, and hence a background cannot be focused by erroneously ranging an object other than the main human object. Therefore, the hybrid AF control is executed, whereby focusing operation with improved responsiveness can be performed. On the other hand, when the external ranging area and the face detection area do not overlap each other, an object other than the main human object is generally ranged in the in-focus position of the focus lens determined by the external ranging method, and hence it occurs that the main human object falls out of focus. Therefore, the focusing operation is performed only by the TV-AF control. This makes it possible to perform stable and high-speed focusing on an object intended by the photographer.

Next, a description will be given of a third variation of the focus control process.

Figure 8:
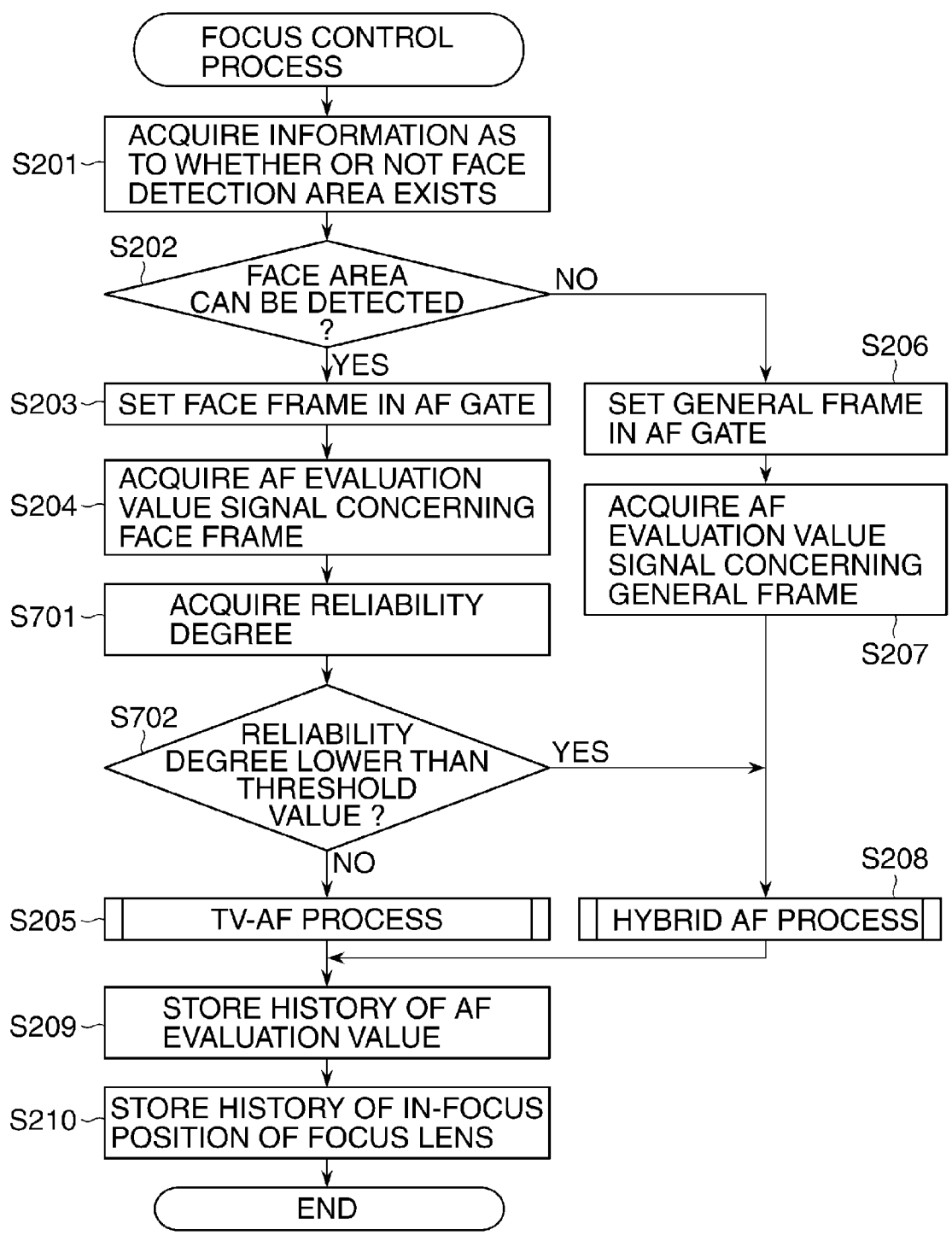
FIG. 8 is a flowchart of a third variation of the focus control process in FIG. 2.

FIG. 8 is a flowchart of the third variation of the focus control process in FIG. 2.

The process in FIG. 8 is basically the same as that in FIG. 2. Therefore, steps identical to those in FIG. 2 are denoted by identical step numbers, and duplicate description thereof is omitted. In the following, a description will be given of only different points from the process in FIG. 2.

In the FIG. 8 process, when a face area could be detected in the FIG. 2 process, the AF control is selected between the TV-AV process and the hybrid AF process according to the degree of reliability indicative of certainty that what is detected as a human face by face detection is actually a human face.

Referring to FIG. 8, after execution of the step S204, not only the position of the detected face area on the screen and the size of the same, but also the degree of reliability indicative of certainty that what is detected as a human face is actually a human face is acquired (step S701) (an example of operation of "a reliability-detecting unit" in the appended claims). This reliability degree is determined e.g. based on a matching degree in pattern matching in the face detection processing or the number of detected feature points, such as shapes of eyes, a mouth, a nose, eyebrows, and a face. The reliability degree may be determined based on any other suitable element insofar as it can indicate certainty that what is detected as a human face is actually a human face. As the reliability degree is higher, it is more probable that the detected thing is a human face, and as the reliability degree is lower, the detection is more likely to be erroneous.

Then, it is determined whether or not the reliability degree is lower than a predetermined threshold value (an example of "a first predetermined value" in the appended claims) (step S702).

If it is determined in the step S702 that the reliability degree is higher than the predetermined threshold value (NO to the step S702), the TV-AF process in the step S205 is executed.

On the other hand, if it is determined in the step S702 that the reliability degree is lower than the predetermined threshold value (YES to the step S702), the hybrid AF process in the step S208 is executed.

According to the focus control process in FIG. 8, when the reliability degree is lower than the predetermined threshold value, even if a face area has been detected, there is a high probability that the face area has been erroneously detected, and further there is a possibility that the reliability degree is reduced due to blur of an image pickup screen. Therefore, the position of the focus lens 105 is shifted close to an in-focus position by the hybrid AF method so as to achieve more reliable face detection. On the other hand, when the reliability degree is higher than the predetermined threshold value, there is a high probability that a face area has been detected, and since the focus lens 105 is positioned close to the in-focus position, the detection has been accurately achieved. Therefore, a stable and high-accuracy focusing operation is performed by the TV-AF control. This makes it possible to perform stable and high-speed focusing on an object intended by the photographer.

The threshold value with which the degree of reliability indicative of certainty that what is detected as a human face is actually a human face is to be compared can be empirically determined based on results of photographing of various objects according to what degree of reliability suffices to avoid erroneous detection.

Next, a description will be given of a fourth variation of the focus control process.

Figure 9:
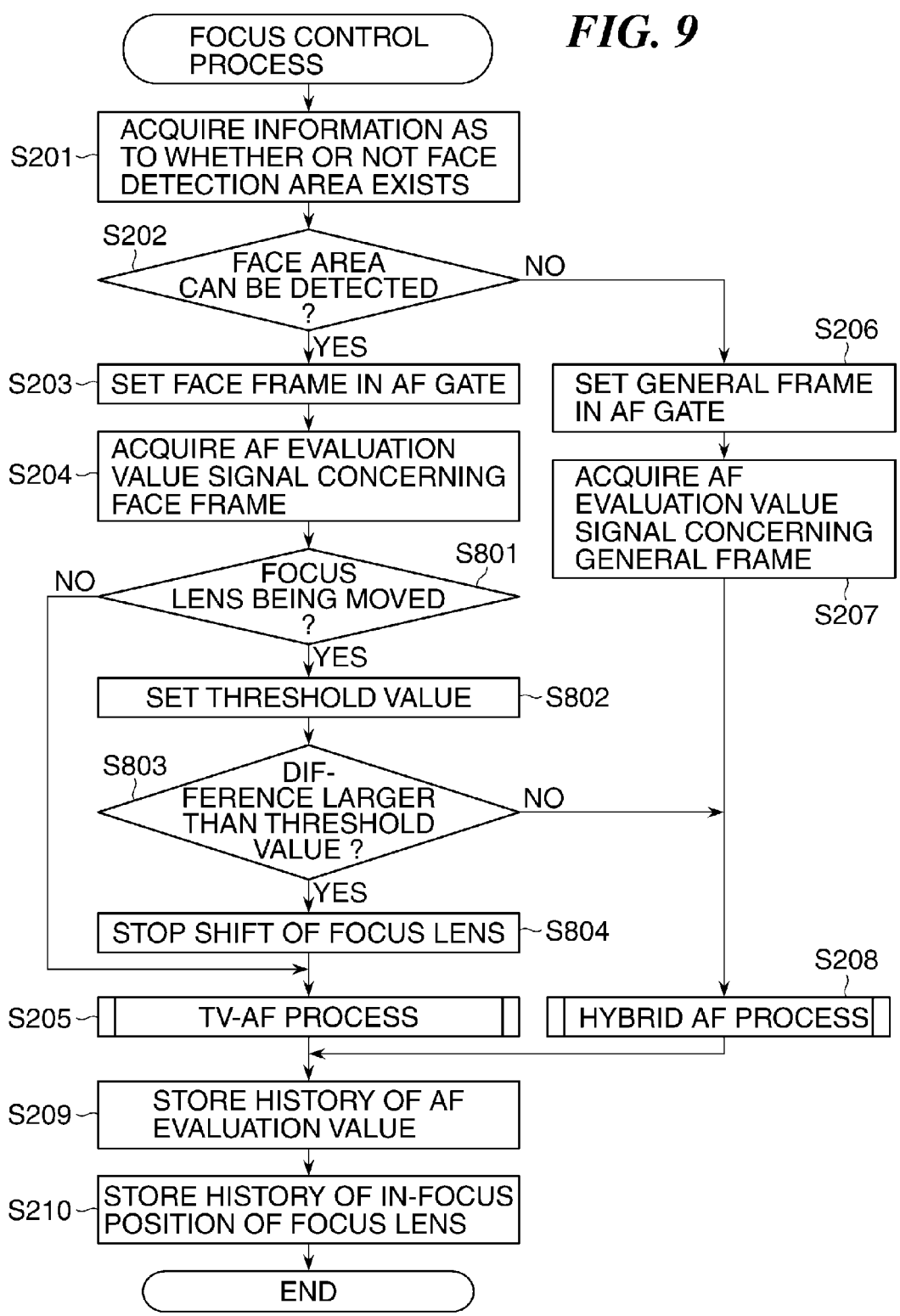
FIG. 9 is a flowchart of a fourth variation of the focus control process in FIG. 2.

FIG. 9 is a flowchart of the fourth variation of the focus process in FIG. 2.

The process in FIG. 9 is basically the same as that in FIG. 2. Therefore, steps identical to those in FIG. 2 are denoted by identical step numbers, and duplicate description thereof is omitted. In the following, a description will be given of only different points from the process in FIG. 2.

The process in FIG. 9 is distinguished from the FIG. 2 process by control executed for face detection during movement of the focus lens 105 to the in-focus position by the phase difference detection method in the AF process included in the FIG. 2 process.

Figure 13:
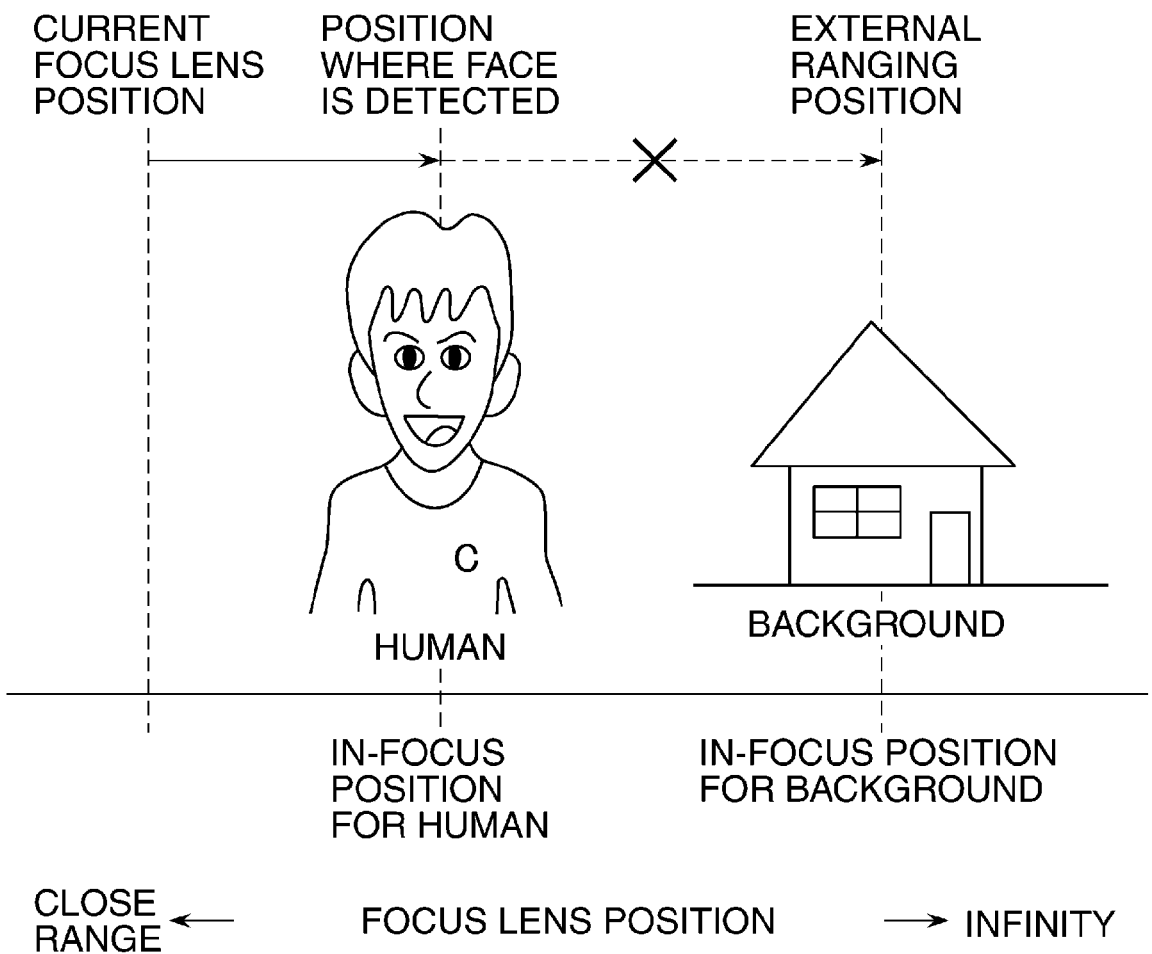
FIG. 13 is a diagram useful in explaining a case where a human face is detected during deviation of the focus lens to an in-focus position.

Particularly when the external ranging sensor is used as shown in FIG. 13, the in-focus position of the focus lens 105 for an object which can be ranged in the external ranging area is not necessarily the in-focus position of the focus lens 105 for the main human object, as described hereinabove with reference to FIGS. 12A to 12C. Therefore, an in-focus position of the focus lens 105 determined by the phase difference detection method can differ from an in-focus position of the focus lens 105 for the main human object. In this case, if the position of the focus lens 105 is shifted to the in-focus position of the focus lens 105 determined by the phase difference detection method, the main human object falls out of focus.

Referring to FIG. 9, after execution of the step S204, it is determined whether or not the focus lens 105 is currently being moved toward the in-focus position of the focus lens 105 determined by the phase difference detection method (step S801).

If it is determined in the step S801 that the focus lens 105 is not being moved (NO to the step S801), the TV-AF process in the step S205 is executed.

On the other hand, if it is determined in the step S801 that the focus lens 105 is being moved (YES to the step S801), the focus lens 105, which is being moved from a position away from the in-focus position based on the result of the phase difference detection, can have been brought to a position, where a face can be detected, close to an in-focus position for the main human object. Therefore, a threshold value (an example of "a second predetermined value" in the appended claims) is set for comparison between the current position of the focus lens 105 where a face is detected and the in-focus position toward which the focus lens 105 is being moved based on the result of the phase difference detection (step S802). This threshold value can be set based on a focal depth or a focal length. In this case, the threshold value is set to be smaller as the focal depth is smaller, and to be larger as the focal length is larger.

Then, comparison is performed between the current position of the focus lens 105 where the face is detected and the in-focus position toward which the focus lens 105 is being moved based on the result of the phase difference detection, and it is determined whether or not the difference (an example of "third information" in the appended claims) is larger than the threshold value set in the step S802 (step S803).

If it is determined in the step S803 that the difference is larger than the threshold value (YES to the step S803), the in-focus position of the focus lens 105 determined by the phase difference detection method is different from that for the main human object, and hence not the main human object but a background object will be focused. As a consequence, the shift of the position of the focus lens 105 based on the result of the phase difference detection is stopped (step S804), and then the TV-AF process in the step S205 is executed.

If it is determined in the step S803 that the difference is smaller than the threshold value (NO to the step S803), it can be judged that the in-focus position of the focus lens 105 determined by the phase difference detection method is substantially the same as that for the main human object. Therefore, the hybrid AF process in the step S208 is executed.

According to the focus control process in FIG. 9, it is possible to perform stable and high-speed focusing on an object intended by the photographer.

Next, a description will be given of an image pickup apparatus according to a second embodiment of the present invention.

The image pickup apparatus according to the present embodiment is distinguished from the image pickup apparatus according to the above-described first embodiment in which the external phase difference detection (external ranging) method is used, only in that the TTL (internal ranging) phase difference detection method is employed. Therefore, duplicate description of the construction and effects is omitted, and only different points of the construction and effects of the present embodiment from those of the first embodiment will be described hereafter.

Figure 14:
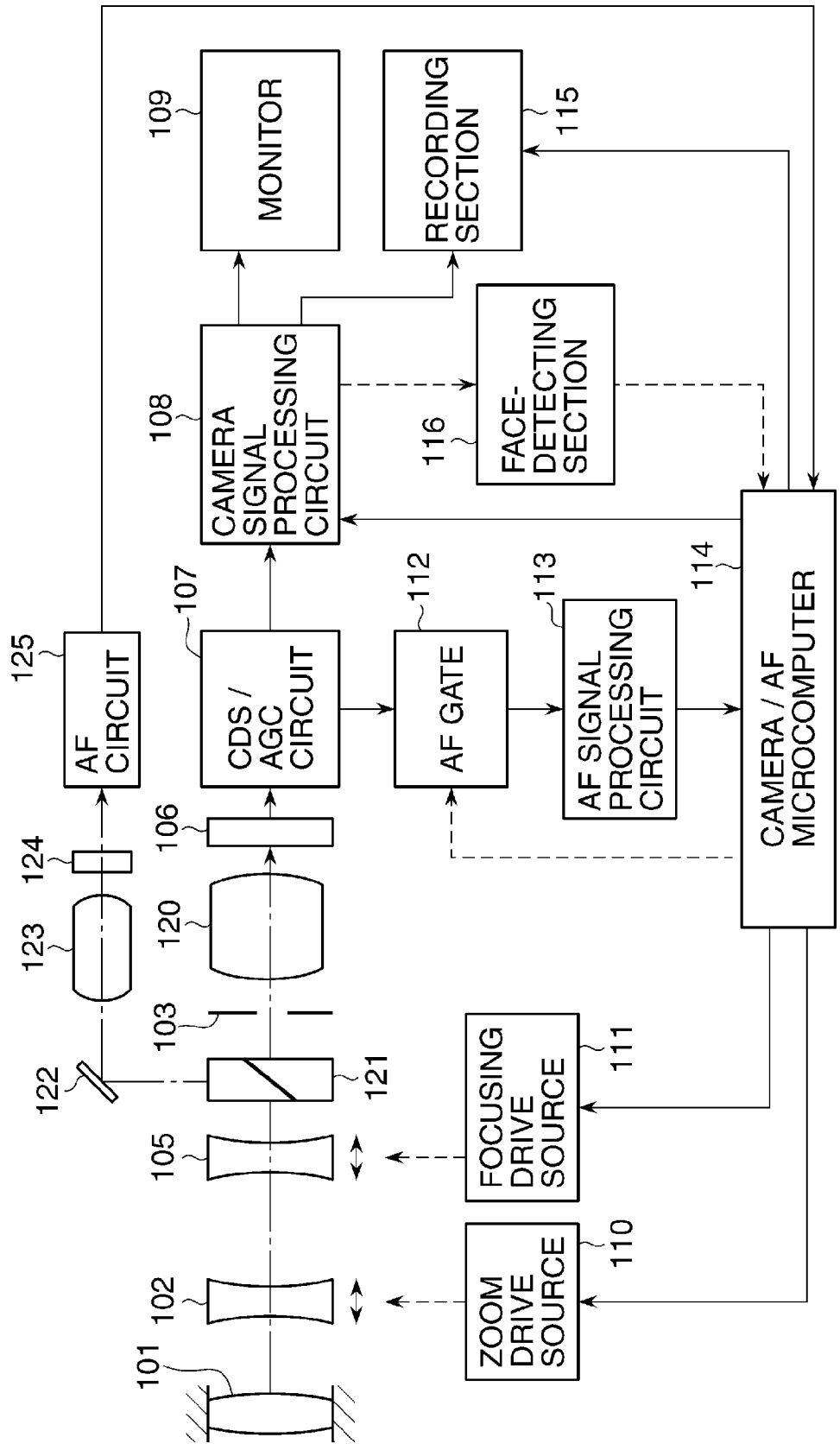
FIG. 14 is a block diagram of essential parts of a video camera as an image pickup apparatus as a second embodiment of the present invention.

FIG. 14 is a block diagram of essential parts of a video camera as the image pickup apparatus according to the present embodiment.

As shown in FIG. 14, the video camera has a photographic optical system comprised of a first fixed lens group 101, a variable power lens 102, a focus lens 105, a diaphragm 103, and a second fixed lens group 120 arranged in the mentioned order from an object side.

Reference numeral 121 denotes a half prism (or beamsplitter). The half prism 121 is disposed between the focus lens 105 and the diaphragm 103. The half prism 121 splits an optical flux directed from the focus lens 105 toward the diaphragm 103 into a first flux component directed toward an image pickup element 106 and a second, separate flux component directed toward an AF sensor 124 described hereinafter. The diaphragm 103 is constantly operating during moving image shooting, and therefore the half prism 121 disposed upstream of the diaphragm 103, i.e. at a location closer to an object, is used to split an incident optical flux.

Reference numeral 122 denotes a submirror that reflects the optical flux component from the half prism 121 toward the AF sensor 124, and reference numeral 123 an imaging lens that causes the optical flux component reflected by the submirror 122 to form an image on the AF sensor 124. The AF sensor 124 has a pair of light receiving element arrays (line sensors) for the phase difference detection AF. Reference numeral 125 denotes an AF circuit that calculates phase difference between two image signals from the respective two line sensors of the AF sensor 124.

A microcomputer 114 determines the amount and direction of focus deviation based on phase difference information (an example of "the second information" in the appended claims) from the AF circuit 125.

The video camera constructed as above is capable of performing a hybrid AF process similar to that in each of the above-described focus control processes, by obtaining the amount and direction of the focus deviation in place of the object distance information.

Further, in the case of the FIG. 9 focus control process, the microcomputer 114 calculates the amount and direction of focus deviation in the step S802, based on the phase difference information from the AF circuit 125. Further, an in-focus position (internal ranging in-focus position) of the focus lens 105 based on the phase difference detection method is calculated, and then, in the step S803, it is determined whether or not the difference between the internal ranging in-focus position and the current position of the focus lens 105 is larger than a threshold value.

A combination of selected ones of the above described focus control processes may be executed, but they are each not to be considered as one and only focus control process to be executed by the video camera.

As described heretofore, in the case of performing AF control by combining the TV-AF method and the phase difference AF method and in the case of performing accurate and stable focusing on an object intended by a photographer, using the face detection processing, the above-described embodiments provide the following advantageous effects:

When a human face is detected, only the TV-AF method is employed. Further, when a human face is detected, by determining the degree of focusing based on the AF evaluation value, determining whether or not the ranging area and the face detection area coincide with each other, or determining whether the degree of reliability indicative of certainty that what is detected as a human face is actually a human face is lower than a predetermined threshold value, if the focus lens is close to the in-focus position and the detected face is substantially in focus, stable high-accuracy focusing is executed by the TV-AF process, whereby it is possible to perform stable, high-accuracy, and high-speed focusing on an object intended by a photographer. Furthermore, it is possible to suppress execution of focusing on an object different from a main human object by the phase difference AF control even though a face is detected and the focus lens is close to the in-focus position for the main human object. This makes it possible to perform stable and high-speed focusing on the object intended by the photographer.

It is to be understood that the present invention may also be accomplished by supplying a system or an apparatus with a storage medium in which a program code of software, which realizes the functions of either of the above described embodiments, is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute embodiments of the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-175620 filed Jul. 4, 2008, which is hereby-incorporated by reference herein in its entirety.

What is claimed is:

1. An image pickup apparatus comprising:
an image sensor for capturing an image formed by a photographic optical system that includes a focus lens;
a detecting unit configured to detect a human face area based on the captured image;
a first generation unit configured to generate first information associated with a state of focus of the photographic optical system based on the captured image, the first information indicating a contrast state of the captured image;
a second generation unit configured to obtain a plurality of split images based on flux received from the object and to generate second information associated with an amount of positional shift between the plurality of split images; and
a control unit configured to execute, at time intervals, focus control including at least one of a first focus control using the first information and a second focus control using the second information; and
a position-detecting unit configured to detect a position of said focus lens where a human face area is detected,
wherein during the focus lens is being driven based on the second information, when a state where the human face area is not detected is shifted to a state where the human face area is detected, if third information which indicates a difference between an in-focus position of said focus lens calculated using the second information and the position of said focus lens detected by said position-detecting unit, satisfies a specific condition that the difference is larger than a second predetermined value, said control unit is configured to stop driving said focus lens based on the second information and then to start the first focus control using the first information based on the captured image in the face area to drive the focus lens to the in-focus position.

2. The image pickup apparatus according to claim 1, wherein said second generation unit is configured to generate the second information associated with a distance to an object.

3. The image pickup apparatus according to claim 1, wherein said second generation unit is configured to generate the second information associated with an amount of deviation of said focus lens from an in-focus position and a direction of movement of said focus lens toward the in-focus position.

4. The image pickup apparatus according to claim 1, further comprising a variable power lens configured to be capable of varying its focal length, and
wherein said control unit is configured to restrict execution of the second focus control according to the focal length.

5. The image pickup apparatus according to claim 4, wherein a condition for restricting execution of the second focus control is eased more as the focal length is longer.

6. A method of controlling an image pickup apparatus provided with an image sensor for capturing an image formed by a photographic optical system that includes a focus lens, the method comprising:
   detecting whether a human face area exists based on the captured image;
   generating first information associated with a state of focus of the photographic optical system based on the captured image, the first information indicating a contrast state of the captured image;
   obtaining a plurality of split images based on flux received from the object and generating second information associated with an amount of positional shift between the plurality of split images;
   controlling execution, at time intervals, of focus control including at least one of a first focus control using the first information and a second focus control process using the second information; and
   detecting a position of said focus lens where a human face area is detected,
   wherein during the focus lens is being driven based on the second information, when a state where the human face area is not detected is shifted to a state where the human face area is detected, if third information which indicates a difference between an in-focus position of said focus lens calculated using the second information and the position of said focus lens detected in said detecting, satisfies a specific condition that the difference is larger than a second predetermined value, said focus lens is stopped driving in said controlling, based on the second information and then to start the first focus control using the first information based on the captured image in the face area to drive the focus lens to the in-focus position.

7. A non-transitory computer-readable storage medium storing computer program code that, when executed on a computer, causes the computer to carry out a method of controlling an image pickup apparatus provided with an image sensor for capturing an image formed by a photographic optical system that includes a focus lens,
   wherein the method comprises:
   detecting whether a human face area exists based on the captured image;
   generating first information associated with a state of focus of the photographic optical system based on the captured image, the first information indicating a contrast state of the captured image;
   obtaining a plurality of split images based on flux received from the object and generating second information associated with an amount of positional shift between the plurality of split images;
   controlling execution, at time intervals, of focus control including at least one of a first focus control using the first information and a second focus control process using the second information; and
   detecting a position of said focus lens where a human face area is detected,
   wherein during the focus lens is being driven based on the second information, when a state where the human face area is not detected is shifted to a state where the human face area is detected, if third information which indicates a difference between an in-focus position of said focus lens calculated using the second information and the position of said focus lens detected in said detecting, satisfies a specific condition that the difference is larger than a second predetermined value, said focus lens is stopped driving in said controlling, based on the second information and then to start the first focus control using the first information based on the captured image in the face area to drive the focus lens to the in-focus position.

* * * * *